(12) United States Patent
Sukkau et al.

(10) Patent No.: US 12,539,091 B2
(45) Date of Patent: Feb. 3, 2026

(54) POSITION DETERMINATION SYSTEM, MEDICAL IMAGING SYSTEM, METHOD FOR POSITION DETERMINATION AND REFERENCE ARRANGEMENT

(71) Applicant: Siemens Healthineers AG, Forchheim (DE)

(72) Inventors: Johann Sukkau, Herzogenaurach (DE); Helmut Wrobel, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 218 days.

(21) Appl. No.: 18/460,876

(22) Filed: Sep. 5, 2023

(65) Prior Publication Data

US 2024/0090858 A1   Mar. 21, 2024

(30) Foreign Application Priority Data

Sep. 6, 2022 (DE) ...................... 10 2022 209 227.9

(51) Int. Cl.
  *A61B 6/04*   (2006.01)
  *A61B 5/055*   (2006.01)
  (Continued)

(52) U.S. Cl.
  CPC ............ *A61B 6/0492* (2013.01); *A61B 5/055* (2013.01); *A61B 6/037* (2013.01); *A61B 90/92* (2016.02); *A61B 2090/3937* (2016.02)

(58) Field of Classification Search
  CPC ....... A61B 6/0492; A61B 6/037; A61B 90/92; A61B 2090/3937
  See application file for complete search history.

(56) References Cited

U.S. PATENT DOCUMENTS 3,816,003 A    6/1974 Litke
4,774,494 A *  9/1988 Extance ................. G01D 5/347
                                                    341/11

(Continued)

FOREIGN PATENT DOCUMENTS

DE    102009043535 A1    3/2011
EP         0560520 A1    9/1993
EP         3964133 A1    3/2022

OTHER PUBLICATIONS

Johann Sukkau „Positionieren des Patienten mit manuell beweglichem Laser"; Apr. 5, 2022.

*Primary Examiner* — Chao Sheng
(74) *Attorney, Agent, or Firm* — Harness, Dickey & Pierce, P.L.C.

(57) ABSTRACT

A position determination system for detecting a position of an object, wherein the position determination system comprises: a reference arrangement with reference colors with a first color code extending in a direction of a path of movement of the object, wherein along the path of movement, the first color code has color-differentiated and non-repeating discrete color sections as reference colors; a sensor unit with a sensor head, the sensor unit configured to read out the reference colors of the reference arrangement arranged at a position of the sensor head and to forward the read out reference colors to an evaluation unit; and at least one light source configured to illuminate the reference colors of the reference arrangement arranged at the position of the sensor head.

17 Claims, 8 Drawing Sheets

(51) Int. Cl.
  *A61B 6/03*   (2006.01)
  *A61B 90/00*  (2016.01)
  *A61B 90/92*  (2016.01)

(56)          References Cited

U.S. PATENT DOCUMENTS

| | | |
|---|---|---|
| 7,196,320 B1 | 3/2007 | Rickenbach |
| 8,461,514 B1 | 6/2013 | Rickenbach |
| 2007/0187582 A1 | 8/2007 | Chin et al. |
| 2008/0232215 A1 | 9/2008 | Hama |
| 2009/0108188 A1* | 4/2009 | Urabe ................ G01D 5/34776 |
| | | 250/231.1 |
| 2013/0342851 A1* | 12/2013 | Dresel .................... G01B 11/24 |
| | | 356/601 |
| 2022/0304634 A1 | 9/2022 | Sukkau et al. |
| 2023/0068970 A1* | 3/2023 | Otsuka ................ G02B 6/4298 |

* cited by examiner

POSITION DETERMINATION SYSTEM, MEDICAL IMAGING SYSTEM, METHOD FOR POSITION DETERMINATION AND REFERENCE ARRANGEMENT

CROSS-REFERENCE TO RELATED APPLICATION(S)

The present application claims priority under 35 U.S.C. § 119 to German Patent Application No. 10 2022 209 227.9, filed Sep. 6, 2022, the entire contents of which is incorporated herein by reference.

FIELD

One or more example embodiments of the present invention relate to a position determination system for detecting a position, speed and/or direction of movement of an object that can be moved along a predetermined path of movement, a medical imaging system, a method for position determination and a reference arrangement.

BACKGROUND

Medical imaging is inter alia performed using combinations of magnetic resonance imaging (MRI) and positron emission tomography (PET). Herein, components used for magnetic resonance (MRI) scans, such as, for example, MRI coils or MRI tabletops can impair the quality of PET images, for example by attenuating the signal. Therefore, it is common practice for the PET signal to be corrected subsequently. Herein, it can be helpful for the position of the tabletop to be ascertained as precisely as possible. Changes in position can be ascertained with the aid of encoders.

Various types of encoders are known from the prior art. For example, there are optical encoders in which a glass rod with applied patterns, for example chrome bars, is used as a scale (see, for example, U.S. Pat. No. 3,816,003 A). Herein, patterns are scanned with an LED and the position is calculated from the signal. This enables very high accuracy in the range of a few micrometers to be achieved. Although, as a rule, these accuracies are more than sufficient, on the other hand, such encoders are also relatively expensive. Possible alternatives are magnetizable bands with position information in which the signal is picked up by a small coil and wire draw encoders, in which a long sturdy wire is wound onto and unwound from a coil, wherein the rotation of the coil is detected by a rotary encoder.

With commonly used encoders, position detection is either absolute or incremental. While, as a rule, incremental detection is easier to implement, it has the disadvantage that, after the encoder is switched on, it is first necessary for a zero point to be approached before the position can be detected by adding positive or negative increments to the zero point. With an absolute encoder, on the other hand, the zero point does not have to be approached because the position information is completely contained at every point of the measuring element.

However, the encoders used to date have various disadvantages. Some encoders, for example so-called OLM encoders, have the disadvantage that they become contaminated relatively quickly over time, so that reliable position detection is no longer possible. An OLM (optical length measurement) encoder consists of a transparent band with opaque bars (for example 1 mm thickness, followed by 1 mm gap, repeating) with an LED light source and two POM optical fibers that transilluminate the band and direct the signal to a photodiode with electronics for counting the bars. Due to the ever-present mechanical slip, previously used rotary encoders, have, for example, a relatively poor accuracy of only 1.5 mm. The accuracy cited here refers to the MRI internal combination of rotary encoder and tabletop mechanics. Other combinations may have better or worse values. The same applies to wire draw encoders used for present-day MRI tabletops, which have an accuracy of about 1 mm. However, PET attenuation correction requires much greater accuracy. Therefore, a magnetic encoder with an accuracy of 0.1 mm is commonly used with PET-only devices (aa well as with PET/CT). However, this magnetic encoder is not MRI-compatible because the signal on the magnetic band would quickly become unusable due to the B0 field of an MRI.

Several encoders optimized for PET/MRI systems are known from the prior art. An incremental encoder is known from U.S. Pat. No. 7,196,320 B1. An absolute encoder is known from U.S. Pat. No. 8,461,514 B1. Both cases entail rotary encoders. In U.S. Pat. No. 7,196,320 B1, the color of the light is filtered through two color filters in the infrared range and is additionally partially covered by a movable aperture or an encoder disk. The two colors cause this method to function in a binary manner, and therefore only in an incremental manner. U.S. Pat. No. 8,461,514 B1 describes a method in which white light is split into its color spectrum in a sensor head with a diffraction grating and parts of the color spectrum are partially covered by an encoder disk with reflected Gray code. In this way, certain wavelengths are removed from the color spectrum. On this basis, evaluation electronics provide a high-accuracy absolute position. However, this method requires expensive components for implementation, such as, for example, two mirrors with an applied diffraction grating and a CCD line camera in the color spectrometer.

SUMMARY

It is therefore an object of one or more example embodiments of the present invention to provide a possibility for position determination that enables sufficient accuracy for use for attenuation correction of PET signals, which is moreover MRI compatible and, finally, can be manufactured and implemented relatively inexpensively. Furthermore, it is desirable to enable the longest possible lifetime of a corresponding position determination system.

At least this object is achieved by a position determination system, a medical imaging system, a method and a reference arrangement as claimed. Further advantages and features also result from the claims, the description and the attached figures.

According to a first aspect of embodiments of the present invention, a position determination system is provided for detecting a position, speed and/or direction of movement of an object that can be moved along a predetermined path of movement, wherein the object is in particular a tabletop of a medical imaging system, wherein the position determination system comprises:

a reference arrangement with reference colors comprising at least a first colored band with a first color code extending in the direction of the path of movement, wherein, along the path of movement, the first color code has color-differentiated and non-repeating discrete color sections as reference colors;

a sensor unit with at least one sensor head, which is embodied to read out the reference colors of the reference arrangement arranged at the position of the sensor head and to forward them to an evaluation unit; and at least one light source, which is embodied to illuminate reference colors of the reference arrangement arranged at the position of the sensor head;

wherein either the sensor head or the reference arrangement is or can be fastened to the object.

The movable object can be a tabletop, preferably a patient table tabletop, in particular of a medical imaging system. The medical imaging system can preferably be embodied to perform positron emission tomography (PET) scans. In particular, the medical imaging system can be embodied for both PET and magnetic resonance imaging. In other words, the medical imaging system can be a combined PET/MRI system. Herein, the position determination system according to one or more embodiments of the present invention has the advantage that it can be compatible with MRI devices, can provide accuracy sufficient for attenuation correction of PET imaging and at the same time can be relatively inexpensive to manufacture. The position determination system can in particular be configured to detect an absolute position of the object. Advantageously, the position determination system can be embodied to detect a plurality of absolute positions one behind the other at predetermined time intervals, in particular to ascertain the speed and/or direction of movement from the absolute positions. The position determination system can be configured to detect the absolute position at least 200 times a second. This can be particularly advantageous for the operation of an MRI device. The predetermined path of movement is in particular the path on which the object usually moves during normal operation. For example, it can be the path of the tabletop which is moved out before the examination and then pushed into an examination area with a patient. The path can, for example, be predetermined by moving the object, in particular the tabletop, on rails or a similar mechanism. In this context, the direction of movement can be understood to be a positive or negative direction along the path of movement. For example, the movement of the tabletop in and out can be understood as movement in positive and negative directions. Alternatively, the path of movement can also be referred to as a trajectory and/or movement curve of the object. Preferably, the path of movement can specify a spatially rectilinear movement. This can be particularly easy to implement and can also be expedient when using a patient table tabletop. However, it is also conceivable that the path of movement specifies a non-rectilinear movement, for example a curved movement. For example, the reference arrangement can be embodied as round and/or the colored bands can be arranged on one or more disks. This can enable the determination of a rotational movement. In particular, the colored bands can be attached to a disk such that in each case the finer colored band is radially further away from the axis of rotation than the coarser colored band. Herein, the first colored band is in particular coarser than the second colored band. In the case of three colored bands, the third colored band is again in particular coarser than the second colored band. For example, an absolute rotary encoder can be implemented. Hence, the position determination system can also serve as a rotary encoder. However, while the position determination system can particularly advantageously be used to determine the position of a tabletop, other applications are also conceivable, in particular for determining the position of other objects. The basic operating principle is not restricted to an application for the examples described herein.

The reference arrangement comprises at least a first colored band, preferably at least two-colored bands. Particularly advantageously, a reference arrangement can contain two or three colored bands. In the context of the present invention, the colored band or bands can also be referred to as a colored track or tracks. The at least one colored band, preferably all the colored bands, can (at least in installed state) in particular have a longitudinal extension along the path of movement. The reference arrangement can, for example, be a measuring band with colors as units of measurement. In particular, the measuring band can comprise a plurality of colored bands or a plurality of colored tracks. The first color code is in particular embodied such that the position determination can take place on the basis of the first color code. For this purpose, the first color code comprises color sections that are arranged discretely, in particular when viewed in the direction of the path of movement and do not repeat. Herein, the color sections in particular correspond to the individual reference colors or represent them. The color sections can in particular be colored strips extending transversely to the path of movement. Preferably, the extension of all color sections in the direction of the path of movement is substantially the same. Herein, "substantially" can mean a deviation of at most 5 percent, preferably at most 3 percent, particularly preferably at most 1 percent. The color sections can in each case be monochromatic and/or in each case lie within an optical frequency range. In other words, a reference color can consist of a discrete wavelength or wavelength range. The reference colors can, for example, be based on the RGB space with the three axes red, green and blue. Alternatively, the reference colors can, for example, be based on the four-dimensional CMYK space with the four axes yellow, magenta, turquoise and black. Other color spaces, for example CIELab, are conceivable. Particularly preferably, a 6-axis color space can be used in which 6 different wavelengths are detected by two or three color sensors. The 6 different wavelengths can, for example, be 445 nm, 480 nm 515 nm, 555 nm, 590 nm, 630 nm. Such a 6-axis color space has been shown to be particularly advantageous or reliable. Alternatively or additionally, a reference color can in each case consist of a plurality of wavelengths. The reference colors can, for example, be generated by color filters configured such that white light from the light source is transmitted through the color filters. Alternatively, the reference colors can, for example, be colors printed on the colored band, wherein colored light is generated by reflection at the respective color section and can be detected by the sensor head. Advantageously, the individual colors are not repeated on the first colored band. As a result, each reference color (which can in particular in each case consist of one or more wavelengths) can describe an absolute position uniquely assigned thereto. Therefore, not only relative position determination with which the object would first have to be moved into a reference position in order to be able to determine an absolute position is possible. The color "red" can, for example, have the position 1 and the color "green" the position 11. The color "yellow", which can consist of both the spectrally pure color of for example 580 nm or also of a combination of "red" and "green", could indicate the position 7. Accordingly, further colors can be provided. Herein, a plurality of finer gradations of the colors can be provided. For example, different levels of red can be provided as different reference colors. Hence, according to one or more embodiments of the present invention, in particular a unique reference color is assigned to each color section or each color section has a unique reference color, wherein a unique absolute position is advantageously assigned to each reference color. Hence, measuring the reference colors at the current position via the sensor unit enables an accuracy to be achieved that depends on the extension of the color sections in the direction of the path of movement.

The sensor unit comprises at least one sensor head. The sensor head is in particular embodied such that it is in each case aligned with a color section of the first colored band in dependence on the current position in each case. Preferably, the sensor head can be embodied to scan at least the first colored band, preferably a plurality of colored bands, in particular two or three colored bands and/or to read them at the current position in each case. In addition, the sensor head can in each case be simultaneously aligned with one color section of a plurality of colored bands. The sensor head can be movable relative to the reference arrangement. In particular, it can be provided that the reference arrangement is fastened to the object so that the reference arrangement moves with the object along the path of movement, wherein the sensor head is preferably immobile. Alternatively, the sensor head can be fastened to the object and the reference arrangement can be immobile. It is also conceivable that the position determination system is provided as an upgrade system, which can, for example, be designed to supplement an existing imaging system, in particular a PET/MRI system. For this purpose, it can be provided that the sensor head or the reference arrangement can be fastened to the object, in particular a tabletop. The reference colors read out can in each case be one color section or two adjacent color sections. This can, for example, be the case if the current position is such that the sensor head is aligned approximately halfway between two color sections. The sensor unit can comprise at least one color sensor, preferably a plurality of color sensors, for example 3 to 6 color sensors, and a control unit, for example a microcontroller. The at least one color sensor can be integrated into the control unit. It can be provided that the position determination system comprises a microcontroller for each color sensor, which is in each case configured to receive the color data from the respective color sensor. The color data can in particular be sent to the respective microcontroller via an exclusive data bus (for example I2C, SPI etc.). Advantageously, this makes it possible for the color measurement to take place simultaneously with all color sensors. Usually, I2C addresses in color sensors are not configurable but fixed. This embodiment or the exclusive data bus enables the problem of the same I2C addresses to be circumvented with integrated color sensors of the same type. The microcontrollers can be configured such that, when each microcontroller has detected the data from the color sensor assigned thereto via I2C, the data is transmitted serially to a master microcontroller via a faster bus (for example SPI). The master microcontroller can correspond to an evaluation unit of the position determination system. The master microcontroller can be configured to coordinate and/or trigger the measurements via the respective microcontroller, wherein the microcontrollers are in each case attached to an IO pin of the master. The microcontrollers can be configured to, as soon as the master microcontroller sets this line to "start measurement", start all color measurements synchronously. The at least one color sensor can in particular comprise photodiodes and optionally further components for color recognition. For example, an integrated component comprising a plurality of photodiodes, integrated color filters, operational amplifiers, multiplexers and ADCs can be provided for the at least one color sensor. Advantageously, this can enable the detection of color information from a plurality of wavelengths with only one component thereby saving costs and space. For example, the AS7341 from AMS can be used for the color sensors. The sensor unit can comprise a standardization sensor configured to detect the colors in the light source's color spectrum. Preferably, the sensor unit can be configured to operate the standardization sensor simultaneously with the at least one color sensor. The sensor unit and/or evaluation unit can be configured to standardize the reference color measured with the at least one color sensor based on the standardization sensor's measurement. Light intensity can fluctuate depending upon the temperature of the light source, for example an LED, the temperature of its environment, possibly the present current intensity of the LED driver (constant current sources can provide slightly fluctuating currents) and the service life that has already taken place. To ensure that this does not have a negative impact on the color measurement, it is possible to take account of this fluctuation by standardization to the measured intensities of the light source (white light standardization). The master microcontroller can be configured to, as soon as it has all the reference colors or measurement data, standardize all color information to the white light of the last color sensor. The sensor head can be a passive optical sensor head, which is in particular embodied to forward the reference colors to the control unit and/or to the color sensors. The sensor unit can comprise an optical fiber, in particular in the form of an optical cable, for example a fiber-optic cable, embodied to forward the reference colors from the sensor head to the at least one color sensor. The coupling of the light from the receiving end of the sensor head into the at least one color sensor can, for example, be provided directly by aligning the optical fiber with the at least one color sensor. For example, the end face of the optical fiber can be fixed directly above the opening of the at least one color sensor. Alternatively or additionally, it can be provided that the light is focused by optical elements, for example with the aid of optical lenses. The sensor unit can in particular be configured to forward the reference colors ascertained to the evaluation unit. For example, digital transmission, for example via a data bus, can be provided for the forwarding. The light source or the end of the light source directed toward the reference arrangement can be integrated into the sensor head.

The light source can in particular be at least one white-light source, for example a white-light LED. The light source can be embodied to generate a neutral white, for example with a color temperature of 4000 K. Additionally or alternatively, the light from the light source can have an Ra or CRI value of >95. A single white-light source can be advantageous, since, for example, less space is required. Optionally, the light source can comprise a plurality of white-light LEDS. Alternatively, the light source can comprise a plurality of monochrome LEDs, wherein the colors of the monochrome LEDs in particular correspond to the reference colors of the reference arrangement. An optical arrangement can be provided that is configured to focus the light from individual LEDs into a single common light beam. It is conceivable that the light source is embodied to generate light outside the visible spectrum. In principle, the solution according to one or more embodiments of the present invention can also function with colors other than the spectral colors of visible light—i.e., for example with near infrared light or UV light. Colors are known from the prior art that absorb, reflect or even convert the light of these wavelengths in the form of luminescence into a light with a shifted wavelength and reflect it. Such effects can also be advantageously used in the context of the present invention. Therefore, in principle, embodiments of the present invention are not limited to the use of white light. The position determination system can comprise at least one light-source optical fiber embodied to guide the light from the light source to the reference arrangement. The position determination system can in each case comprise a light-source optical fiber for each colored band in the reference arrangement. A lens system embodied to couple light from the light source into the light-source optical fiber can be provided. For example, the lens system can comprise two lenses, for example two PCX lenses comprising a capacitor lens and a fiber coupler lens. Preferably, the at least one light-source optical fiber can be arranged such and/or the position determination system can comprise optical elements which are arranged such that the light from the light source is formed into a light strip. The optical elements can comprise at least one optical lens, at least one mirror, at least one aperture and/or at least one optical prism. The at least one lens can, for example, be embodied as round or cylindrical. Preferably, the longitudinal extension of the light strip can be aligned perpendicular to the path of movement and/or to a direction of movement in which the sensor head can be moved. Preferably the light strip can be focused on the surface of the reference arrangement. For example, an arrangement of a plurality of light-source optical fibers can be provided that are arranged such that the light strip is formed from light points of the individual light-source optical fibers. Preferably, the at least one light-source optical fiber, preferably all the optical fibers, can be arranged close in front of the reference arrangement, in particular at a distance of less than 5 mm, preferably less than 3 mm, particularly preferably less than 1 mm. It has been shown that effective illumination of the reference arrangement is enabled more effectively with such a short distance. Herein, a distance of less than 1 mm can be particularly effective. Additionally or alternatively, it can be provided that the optical elements narrow the width of the light strip directed in the direction of the path of movement. For this purpose, it is in particular possible to use optical lenses. Optionally, in addition, one or more mirrors and/or one or more prisms that reflect the light about a spatial axis, for example, can be provided. The position determination system can comprise a fiber bundle, wherein the fiber bundle comprises the at least one light-source optical fiber and at least one optical fiber, which directs light of the reference colors from the sensor head to the at least one color sensor of the sensor unit. For example, the fiber bundle can comprise three light-source optical fibers and one optical fiber leading from the sensor head to the at least one color sensor. It can be provided that more than one light-source optical fiber is used for each colored band. Advantageously, when a plurality of light-source optical fibers are used, it is possible to use significantly thinner fibers, for example PMMA fibers, for example with a diameter of less than or equal to 0.75 mm, less than or equal to 0.5 mm or even about 0.25 mm. The plurality of light-source optical fibers can be arranged in a row such that they generate a narrow strip of light consisting of a plurality of points corresponding to the number of light-source optical fibers in the row or project it onto the at least one colored band.

The sensor head can comprise one or more light emitters and one or more light receivers. The light emitters can be the light source or part of the light source. The number of light emitters and/or light receivers can in particular correspond to the number of colored bands in the reference arrangement. The light emitters can be configured in each case to generate and shape a light strip, in particular a generally diverging light strip, and project it onto the colored bands assigned thereto in each case. Each or at least one of the light emitters can, for example, comprise an LED, wherein the LED generates in particular broadband light in the range between UV and near IR. Alternatively, each or at least one of the light emitters can comprise an LED and a light tube that in particular guides and shapes the light. Further alternatively, each or at least one of the light emitters can comprise an LED and coupling optics and one or more optical fibers, wherein the optical fibers are in particular arranged in a row. Further alternatively, each or at least one of the light emitters can comprise an LED, coupling optics, an optical fiber and a light tube. Additionally or alternatively, all the light emitters can use the light from an LED, in particular a larger LED. Each or at least one of the light receivers can comprise one or more color sensors. Alternatively, each or at least one of the light receivers can comprise an optical fiber and one or more color sensors. Further alternatively, each or at least one of the light receivers can comprise a light tube and one or more color sensor(s). Further alternatively, each or at least one of the light receivers can comprise an optical fiber and a light tube and one or more color sensor(s). The variants of the light emitter can be combined in any way with the variants of the light receiver.

The evaluation unit can optionally be part of the position determination system. For example, the evaluation unit can be a microcontroller or part of a microcontroller. Alternatively, the evaluation unit can be an external computer unit, for example an external computer or server. The evaluation unit can preferably be configured to receive the read-out color references and to ascertain the current position of the object based on the color references. The evaluation unit can be embodied to forward the position ascertained, for example to a system that performs attenuation correction of the PET scan and/or stores the position ascertained. The evaluation unit can comprise a memory unit for storing the position data ascertained.

Advantageously, the position determination system according to embodiments of the present invention offers the possibility of performing absolute position determination. As a result, there is no need to approach a zero point which is required for relative position determination of an incremental system. This can save time and energy during operation, since the object has to be moved less. Hence, a medical scan can, for example, be started more quickly after a scanning system, for example a PET/MRI system, has been switched on. Furthermore, the position determination system can be MRI compatible because its components can be made of non-magnetic parts. Moreover, purely passive components, such as the reference arrangement or also a passive sensor head, do not generate any EMC interference, or only generate insignificant EMC interference, and any image artifacts in MRI or PET images. Furthermore, the position determination system can be manufactured relatively inexpensively compared to solutions in the prior art since no expensive components are required. Furthermore, the position determination system according to one or more embodiments of the present invention can be insensitive to EMC interference. For example, it may be largely unaffected by radio discharge or other types of broadband interference. This insensitivity, especially also in conjunction with the other advantages, can also make the position determination system useful for other industrial or commercial applications, for example in gas or oil production.

According to one embodiment, the position determination system comprises at least one optical fiber attached to the sensor head which guides light from the sensor head to a central unit of the sensor unit, wherein the central unit is configured to determine the wavelength of the detected light. Advantageously, the sensor head can be embodied as a purely passive sensor head. Herein, the optical fiber can forward ascertained light to the actual sensors in the central unit. If the object is a patient table tabletop, the sensor head is necessarily relatively close to the patient and therefore potentially exposed to different types of MRI and PET interference.

As a purely passive optical component, the sensor head does not have to contain any electrically conductive or magnetizable components. This advantageously creates no MRI artifacts due to eddy currents, no B0 artifacts and no significant attenuation of the PET signal. It can be provided that signals are routed to and from the sensor head in the form of light via the one or more optical fibers. The at least one optical fiber can be made of quartz glass or plexiglass (PMMA). The at least one optical fiber can, for example, be connected to color sensors in the central unit by through-holes in a screen housing of the MRI system or by a filter plate in the MRI booth. Herein, the central unit with the sensor electronics can be arranged in the MRI booth, but further away from the patient than the sensor head, or outside the MRI booth.

According to one embodiment, the sensor head has a dust-tight area in the area of the at least one optical fiber, so that dust deposition on an end face of the optical fiber is reduced. The dust-tight area can also be air-tight. An outer wall of the dust-tight area between the optical fiber and the reference arrangement can have at least one lens, in particular at least one converging lens. The lens and/or the dust-tight area in the sensor head can ensure that the relatively small end face of the at least one optical fiber does not come into contact with dust. The dust-tight area of the sensor head can be sealed from the outside on the side exposed to dust by one or more lenses. The diameter of the converging lens can advantageously be significantly larger than the diameter of the at least one optical fiber. Hence, advantageously, significantly more dust particles have to adhere to the lens surface for the light transmission to significantly deteriorate to the same extent as would be the case with the smaller cross section of the optical fiber. This embodiment can ensure that the position determination system is significantly less impaired by dust deposition than would otherwise be the case, and thus the working life can be significantly extended. Initial estimates have shown that this can enable error-free operation for at least 10 years.

According to one embodiment, the reference arrangement comprises a second colored band with a second color code, wherein the second color code has a plurality of sub-color codes that are periodically repeated along the path of movement, wherein each sub-color code has color-differentiated and non-repeating discrete color sections in the direction of the path of movement as further reference colors, wherein preferably the extension in the direction of the path of movement of each sub-color code is not less than the extension in the direction of the path of movement of a single one of the color sections of the first color code. In particular, it can be provided that the extension in the direction of the path of movement of each sub-color code at least substantially corresponds to the extension in the direction of the path of movement of a single one of the color sections of the first color code. In other words, therefore, in addition to the first colored band in which no reference color is repeated, it can be provided that a second colored band is provided in which a specific color sequence is repeated in the direction of the path of movement, in particular several times. Preferably, the extension of the first colored band is substantially equal to the extension of the second colored band. In the context of this embodiment, "substantially" can in particular be understood to mean that a difference corresponds to less than 5%, preferably less than 3%, particularly preferably less than 1%. Hence, advantageously, the first colored band can be used for absolute position determination, since each reference color only occurs once here. Although, due to the repetition of identical sections, the second colored band cannot be used alone for absolute position determination, the approximate absolute position can always be determined by combination with the first colored band. Hence, within this rough absolute position, a more precise determination can be made with the aid of the finer division of the sub-color codes. Preferably, each sub-color code of the second colored band can have a similar number or the same number of reference colors as the color code of the first colored band. In particular, each sub-color code can represent a repetition of the color code of the first colored band that is reduced in the direction of the path of movement. Advantageously, it can be provided that the first color code comprises 20 to 100 color sections and/or reference colors, preferably 35 to 60, particularly preferably 40 to 50, and quite particularly preferably 47. In addition, it can be provided that the sub-color codes comprise 20 to 100 color sections and/or reference colors, preferably 35 to 60, particularly preferably 40 to 50, and quite particularly preferably 47. These ranges have been shown to be particularly advantageous in order to still be well detectable by a sensor head. 35 to 60 color sections are particularly advantageous for determining the position of patient table tabletops. With a usual tabletop length of, for example, 2.2 m, a range of 40 to 50 color sections has been shown to be particularly advantageous in order to obtain sufficiently good resolution for PET correction in connection with a second colored band. Herein, as has been shown, a particularly optimized solution can entail the use of 47 color sections. Hence, with the example of a 2.2 m tabletop, the 47 color sections of the first colored band have an extension in the direction of the path of movement of approximately 47 mm (=2.2 m/47). Hence, consequently, a rough position determination can be made to 47 mm accuracy based on the first colored band. The position can now be determined even more accurately, namely in this example to an accuracy of approximately 1 mm (=47 mm/47), based on the second colored band, which preferably consists of periodic and reduced repetitions of the first colored band. Preferably, the colored bands can be arranged next to one another, in particular directly next to one another. In particular, the colored bands can be arranged such that they extend parallel to one another along their longitudinal direction along the path of movement. The color spectrum of the various colored bands, i.e., the reference colors of the colored bands used can preferably be at least predominantly the same or completely the same. Hence, preferably, the entire bandwidth of available colors, which may be limited by the accuracy and bandwidth of the sensor unit and the possible representation of a plurality of colors, can be used. It can be provided that the sensor unit is configured to scan the second colored band such that proportional color mixtures in the border area between two color sections of the sub-color codes are also detected. Preferably, the reference colors are selected such that all possible color mixtures are unique. The position determination system, in particular the evaluation unit, can be configured to perform a finer position determination based on the color mixtures. For example, the sensor unit can be embodied to scan the sub-color codes in steps corresponding to $1/20$ to $1/2$, preferably, $1/15$ to $1/5$, particularly preferably approximately 1/10, of the extension of the second color sections in the direction of the path of movement. In other words, hence, a position determination can be enabled that has a greater precision than the width of the color sections in the direction of the path of movement. For this purpose, preferably, the diameter of the light spot generated by the light source on the reference arrangement can approximately correspond to the width of the color sections. It has been shown that such a light spot enables scanning of mixtures of reference colors to function particularly reliably.

According to one embodiment, the reference arrangement comprises a third colored band with a third color code, wherein the third color code has a plurality of further sub-color codes that are periodically repeated along the path of movement, wherein each further sub-color code has color-differentiated and non-repeating discrete color sections in the direction of the path of movement as further reference colors, wherein in particular the extension in the direction of the path of movement of each further sub-color code substantially corresponds to the extension in the direction of the path of movement of a single one of the color sections of the second color code. A third colored band can further improve accuracy. Alternatively or additionally, reliability can be further improved, since high accuracy can be achieved with fewer different reference colors. As a result, requirements for the sensors with respect to differentiating between different reference colors can be reduced. Preferably 8 to 30 colors can be provided for each colored band. Hence, compared to the version with two colored bands, the number of colors required can be reduced, wherein comparable or even better accuracy can be possible. Particularly preferably, the use of 12 to 20 reference colors can be provided for each colored band. Preferably, the same colors can be used for each colored band. This number has been shown to be particularly reliable, wherein it is also possible to achieve sufficient accuracy for the purposes of determining PET attenuation correction. According to a preferred example, 16 reference colors can be used for each colored band. The 16 reference colors can preferably be the same for each colored band. With 16 reference colors, it can be possible to achieve a resolution of approximately 0.54 mm (=2200 mm/(16×16×16)) without multiple scanning. It can be provided that mixed colors of adjacent color sections are scanned within at least one of the colored bands. Hence, according to the example, 10-fold scanning of the third colored band could enable a resolution of approximately 0.54 mm/10=0.054 mm to be achieved.

Tests have shown that a variant of the sensor head with two colored bands and 47 colors each and with only two optical fibers for each colored band (one optical fiber as an emitter and one as a receiver) can suffice for a resolution of 0.3 mm. An even higher resolution can, for example, be achieved with more colored tracks/colored bands and/or with additional optical elements or optical fibers.

Preferably, the position determination system can be configured to detect all the colored bands simultaneously. Preferably, the colored bands are detected repeatedly with a frequency of more than 200 Hz. This minimum detection rate can be particularly favorable with MRI applications. It can be provided that at least 2 or 3 color sensors operating in parallel are used. This can be advantageous for taking account of a limited data transfer rate, for example I2C.

According to one embodiment, the color sections of the first colored band and/or at least one further colored band, in particular all the colored bands, are opaque to colors of the colored band, wherein the sensor unit is embodied to read the color sections in that light emanating from the light source and reflected by the respective color sections is detected by the sensor unit. In particular, the reference colors can be printed on the colored bands. For example, the reference colors can be digitally printed on an opaque carrier, which can in particular be part of the reference arrangement, in the form of opaque or non-transparent colors. The carrier can, for example, be a printable strip, in particular a paper strip, or comprise the strip. The length of the strip can correspond to the length of the object in the direction of the path of movement. The strip can, for example, have been printed with a color printer. The carrier can comprise a dimensionally stable rod, for example a plastic rod, on which the strip is arranged, in particular fastened. The plastic rod can, for example, be made of rigid PVC. The strip can, for example, be glued to the rod. The strip can, for example, be laminated with a transparent protective layer, for example PET. Advantageously, a plastic layer can increase the lifetime of the printed colors and thus the service life of the reference arrangement. The surface of the strip, in particular the paper surface of the paper strip (or the surface of another comparable or printable material) can typically be rough. Therefore, light is reflected diffusely from this rough surface, in particular approximately uniformly in all spatial directions. The color appears as such at this point because only this color portion of the white light corresponding to the reference color is reflected. The other colors are absorbed. The advantage of this method is the fact that the reference arrangement is particularly easy to manufacture according to this embodiment. It is also possible to achieve a durability of many years of the reference colors printed on the strip relatively unproblematically.

According to one embodiment, the color sections of the first colored band and/or at least one further colored band, in particular all the colored bands, are transparent to light of the color of the respective color section and opaque to light of the colors of the other color sections. According to a first variant, the light source and the sensor head are arranged on opposite sides of the reference arrangement, wherein the sensor unit is embodied to detect light from the light source transmitted through the color sections. According to a further variant, the light source and the sensor head are arranged on the same side of the reference arrangement opposite the colored band, wherein, from the viewpoint of the light source, a reflector is arranged behind the color sections, so that light emanating from the light source passes from the reflector to the sensor head after being transmitted twice through the color section and being reflected in-between. Advantageously, the reference color can thus be generated by transmission of the respective color. Whereas, with diffuse reflection, a relatively large amount of light is lost and only a fraction is captured by the receiving end of the sensor head, transmission, and possibly largely complete reflection, enables a larger proportion of the light used also to be used for detection or to be detected by the sensor head. Therefore, it is also possible to use a less powerful light source in this embodiment. The transparent color sections can, for example, comprise transparent colors printed on transparent material, in particular transparent film. The film can, for example, be PVC film or polycarbonate film. For example, herein, the digital printing can have been carried out with an eco-solvent digital printing method. Other methods that are also suitable can, for example, be UV direct printing or latex ink printing. The film can be arranged or fastened on a solid carrier. The carrier can be a rod made of a transparent and solid material. For example, the carrier material can be transparent and solid polycarbonate. Therefore, advantageously, each color section is substantially or largely only permeable to the portion of white light that corresponds to the respective reference color. During transmission, in particular the direction of the light rays does not change significantly. According to the first variant, the light source and the sensor head of the sensor unit can be arranged in an axis collinear manner on opposite sides of the colored band or the colored bands. Accordingly, it is in particular provided that the detection of the reference colors takes place in a transmission mode. Placing the sensor head and light source on the same side can be advantageous if, for example, only a specific sensor size is permissible or if there is insufficient space for placing on both sides of the reference arrangement. The reflector can in particular be embodied to reflect light, in particular light of the reference color, in a directed manner. Herein, the direction in particular matches the relative position of the sensor head. The reflector can, for example, be a mirror or mirror film. Here, it is in particular provided that the white light from the light source passes through the color section acting as a color filter to the mirror layer, is reflected in a directed manner by this layer and passes through the color filter or the color section again and is detected by the sensor unit, in particular the sensor head.

Advantageously, in the further variant, the carrier can also be non-transparent. For example, the reflector can be arranged or fastened on the carrier, wherein the color filters or the color sections are arranged or fastened on the reflector. Here, the carrier can alternatively also be made of PVC or another stable plastic.

According to one embodiment, the reference colors only comprise light colors, wherein light colors are in particular colors that have a value of not less than 90 in the RGB color space in at least one color channel and/or a K value of not more than 0.65 in the CMYK color space. For these values, in particular an 8 Bit RGB color space with values of from 0 to 255 is assumed. In the CMYK space, the K value stands for black, wherein 1 is the maximum. With reference to other color spaces, the definition for light colors can be understood to be correspondingly adapted to the respective color space. It has been found that the choice of colors can have a significant impact on the reliability and functionality of position determination. For example, it has been recognized that dark colors are harder to recognize in the context of the subject matter of embodiments of the present invention than light colors. This can be explained by the fact that dark colors reflect significantly less light, thereby increasing signal noise. Therefore, using only light colors can improve the reliability of position determination.

According to one embodiment, viewed in the direction of the path of movement, the reference colors of a color code, in particular the first color code and/or further color codes, are selected and arranged one behind the other such that they lie in the color space on a non-self-intersecting coherent trajectory, wherein in each case in particular the Euclidean distances of adjacent colors in the color space are in each case at least substantially the same size and at least approximately maximized with respect to the total available color space. Herein, "substantially" can be understood to mean that the distances do not deviate from one another by more than 5%, preferably not more than 3%, particularly preferably not more than 1%. On transitions between the color sections, it should be noted that, at the boundary, the adjacent reference colors are mixed by the sensor head. Herein, mixed colors occur, which, corresponding to the overlap on the respective color section, proportionally add its color or reference color to this mixed color.

If this is not taken into account when selecting the colors, it can be the case that such mixed colors collide with the other reference colors (i.e., in particular the same or very similar detected effective colors) and, as a result, the position recognition becomes ambiguous or less reliable. The sequence of colors selected in this embodiment can therefore play a significant role in the reliability and quality of the position determination. Such mixed colors only occur between the reference colors of adjacent color sections. Defining the reference colors on the colored bands as a coherent trajectory in the respective 3d or 4d space (in the RGB or CMYK space) advantageously enables it to be ensured that the mixed colors between the adjacent color sections on the colored bands that occur during the scanning of the boundaries also lie on the trajectory connecting these two points and therefore there can be no collisions with other reference colors. Choosing the Euclidean distances of the colors on the trajectory as far apart as possible enables the reliability of the recognition of the individual reference colors to be optimized. It can, for example, be provided that the color trajectories in a designated area in the color space are divided into steps of equal size. This can, for example, be achieved by first ascertaining experimentally how close the colors in a color channel (corresponding to an axis in the color space) may be so that the sensor can still reliably tell them apart. It was, for example, ascertained for a sensor of the type AS7143 that at least a distance of 30 is needed in the channel "red/650 nm". Hence, the possible values for this color channel could, for example, be 90, 120, 150, 180, 210, 235, 255. Corresponding measurements can be performed for the other color channels (for example green, blue) in order to ascertain the permissible values for these as well. Then, for example, permutations and combinations can be used to create all possible colors that can be considered to be potential reference colors. The colors ascertained can then in particular be arranged on the measuring band in such a way that their sequence leads to a 3d (or 4d) trajectory through the color space that is coherent, the color space as uniformly as possible and does not intersect itself.

According to one embodiment, the position determination system comprises the evaluation unit, wherein the evaluation unit is configured to receive the read-out reference colors and to ascertain the current position of the object based on the reference colors. The evaluation unit can be a master microcontroller, as described herein.

The evaluation unit, and optionally parts of the light source and/or the sensor unit, in particular the color sensors and/or microcontrollers of the sensor unit, can be shielded with an EMC shield. The EMC shield can, for example, be a box made of carbon fiber mats or copper wire mesh mats or a combination of both materials. The EMC shield can comprise openings for optical fibers or light-source optical fibers. The position determination system can comprise a galvanic supply line, for example for a power supply, and/or communication lines for controlling an object or controlling a tabletop that are shielded with an EMC shield. Advantageously, EMC shielding enables the electronics to be used in parallel with MRI or PET imaging without MRI or PET artifacts.

According to one embodiment, the evaluation unit comprises a database in which predetermined reference colors are assigned to a position and/or position data, wherein the evaluation unit is configured to detect the predetermined reference color with the shortest distance to the reference color ascertained in each case in a color space and to assign a position within a color code thereto on the basis of the database. The database can store a list with reference colors and associated position data. The database can be a non-volatile memory. The memory can, for example, be an external or integrated EEPROM. Other alternatives, such as, for example, an SD card and read-write electronics by the master microcontroller or other/similar solutions are conceivable. Additionally or alternatively, the evaluation unit can be configured to transmit database data dynamically to a volatile memory (for example RAM) from an external source (for example from an MRI MARS/host computer). The evaluation unit can be configured to determine the Euclidean distance between the measured reference color and the predetermined reference colors in the database and to determine the predetermined reference color with the shortest Euclidean distance to the measured reference color. The evaluation unit can be configured to ascertain the absolute positions from the measured reference colors by matching the measured reference colors with the predetermined reference colors in the database. The database can comprise a reference table in which position data is assigned to the predetermined reference colors.

According to one embodiment, the evaluation unit is configured to carry out a rough position determination based on the detected reference color of the first colored band and to specify the rough position determination more precisely as a finer position determination based on the detected reference color of a further colored band, in particular the second colored band. For this purpose, in particular a finer relative position based on the second colored band can be added to the rough absolute position determined by the rough position determination. Optionally, the evaluation unit can be configured to specify the finer position determination even more precisely based on the detected reference color of a further colored band, in particular the third colored band. An even finer relative position based on the third colored band can be added accordingly to the position ascertained based on the first and second colored band.

According to one embodiment, the sensor head can be displaced in the direction of the path of movement, in particular displaced in a translatory manner, wherein the position determination system in particular comprises a stepper motor for displacing the sensor head. The position determination system can be configured to calibrate the position determination by displacing the sensor head in predefined steps along the reference arrangement and detecting the reference colors after each step. Herein, calibration in particular designates a process of creating the predetermined reference data in the database that matches the reference arrangement. The position determination system can be configured to define an absolute position of the object via the calibration. The position determination system can be configured to perform a calibration by automatically moving the sensor head in defined steps over the reference arrangement and measuring the reference colors of the colored bands as color data and by combining and storing the color data and the respective absolute position to form a dataset. Herein, it can be assumed that, to a certain extent, the finer the individual steps along the colored band with the lowest resolution are selected, the more accurately the subsequent position detection with the aid of the reference data can take place. However, accuracy can be limited by the spatial extension of the color sections in the direction of the path of movement in that, at some point, if the steps are too small, adjacent positions may no longer be distinguishable, since the sensor unit may possibly measure the same colors at the adjacent positions and the two positions can then no longer be distinguished. Therefore, accuracy can be limited by the width of the color sections and the accuracy of the sensor unit. In the case of coarser colored bands (in particular the first colored band), in particular if the dimension of the individual color sections is significantly larger than a light spot of the sensor head, it can be provided that fine scanning is only performed at the transition points between the individual color sections. The stepper motor can be arranged on a linear axis. Alternatively, the stepper motor can be arranged on a curved axis. The path of movement of the stepper motor can in particular be aligned corresponding to the path of movement of the object.

According to one embodiment, the position determination system is configured to recalibrate the reference colors at predetermined time intervals, in particular by moving the object from one end point of the path of movement to the other while continuously detecting the reference colors of the reference arrangement and adjusting the database in the case of deviations from the actual reference colors. An end point can in particular be a stop point, for example a "home position", of the object. The object can be moved to the first end point automatically. Alternatively, it can also be provided that the object is moved manually, for example by a service technician, to the first end point. During recalibration, the current position determination of the evaluation unit can preferably be deactivated, in particular since the position data is to be redefined. When the second end point is reached, the motor can be switched off by a reference switch. The reference switch can be activated automatically when the end point is reached. Alternatively or additionally, the reference switch can be activated by a user. The reference switch can, for example, correspond to the left and right reference switches of the tabletop commonly used in the prior art. The position determination system can be configured to measure the reference colors continuously and compare them with predetermined reference colors stored in the database during the journey from one end point to the other. The position determination system can be further configured to overwrite the values of predetermined reference colors in the database with the reference colors measured during recalibration if a significant change in the measured reference colors or a significant deviation from the expected color values is established. It can be provided that only the reference colors of the first colored band are measured during recalibration and that the predetermined reference colors of other colored bands are uniformly adjusted based on this measurement. Herein, it is in particular assumed that the reference colors of all the colored bands change approximately uniformly. This can be particularly advantageous if the same spectrum of colors is used for all the colored bands.

The components of the position determination system can age over time. For example, the color pigments of the reference arrangement can fade, the light transmission of the optical fibers can decrease and the intensity of the light source, in particular LEDs of the light source, can deteriorate. Advantageously, recalibration can address or compensate aging or fading of the colors, aging of the LED and aging of optical fibers. The position determination system can be configured to automatically analyze a color ageing tendency. This can advantageously increase the chance of recalibration being performed in good time or at the required time. The tendency to age can, for example, be analyzed by continuously monitoring the reference colors by the position determination system during operation of the position determination system and establishing significant ageing in the event of significant deviations. The position determination system can, for example, be configured to output an indication of ageing and/or the need for recalibration to a user in the event of significant ageing. Alternatively, the position determination system can, for example, be configured to perform recalibration automatically if significant ageing is established. Additionally or alternatively, it can be provided that the position determination system is replaced at predetermined intervals, for example every 10 years. The position determination system can be configured to output a message to the user when a predetermined time has elapsed after which replacement of the position determination system is provided.

Additionally or alternatively, it can be provided that the reference arrangement is arranged in a dust-tight and light-proof U-shaped profile. Advantageously, a U-shaped profile can reduce the penetration of dust and the effect of UV light on the reference colors. This can enable a significantly longer lifetime of the colors, in particular of more than three years.

A further aspect of one or more embodiments of the present invention is a medical imaging system, in particular a PET/MRI imaging system, comprising a position determination system, as described herein, and a patient table tabletop, wherein the reference arrangement is fastened to and/or arranged on the patient table tabletop. The reference arrangement of the position determination system can in particular be arranged and/or fastened laterally along the longitudinal direction of the patient table tabletop on the patient table tabletop. All advantages and features of the position determination system can be transferred analogously to the medical imaging system and vice versa.

According to one embodiment, the reference arrangement and the sensor head are arranged in a common dust-tight housing. The common dust-tight housing can preferably be opaque, in particular opaque to UV radiation. Exposure to dust or general contamination of the sensor head could render the sensor head unusable over time. Advantageously, this embodiment can prevent the measurement components being exposed to dust and other contamination, in particular the sensor head and the reference colors (and fading of the reference colors). The dust-tight housing can be a U-shaped profile with a length corresponding to the length of the object or the patient table tabletop in the direction of the path of movement. The dust-tight housing can, for example, be made of aluminum or plastic. The U-shaped profile can comprise two rubber lips sealing the opening of the U-shaped profile in a dust-tight manner. The sensor head can be arranged or fastened on a mount embodied to slide between the rubber lips. The optical fibers can be arranged such that they extend along the longitudinal direction of the housing, in particular along the mount. The housing, in particular the U-shaped profile, can preferably be fastened underneath or on the side of the patient table tabletop or on a movable part of a patient table tabletop comprising the patient table tabletop. The sensor head mount can preferably be attached to a non-movable part of the patient table, wherein the non-movable part can in particular be the substructure of the tabletop. The mount can preferably be fastened directly to a zero point of the tabletop. The zero point of the tabletop can be arranged at the head end of the patient table tabletop, directly below the measurement tunnel entrance or bore entrance.

A further aspect of one or more embodiments of the present invention is a method for position determination of a tabletop of a medical imaging system, in particular using a position determination system as described herein. The method comprises the steps:

illuminating a reference arrangement with reference colors with at least one light source at the position of a sensor head of a sensor unit;

reading out the reference arrangement by detecting the reference colors at the position of the sensor head by the sensor unit and forwarding the detected reference colors to an evaluation unit;

ascertaining the current position of the table based on the detected reference colors by an evaluation unit.

All advantages and features of the position determination system and of the medical imaging system can be transferred analogously to the method and vice versa. It can be provided that repeated ascertaining of the position is used to determine a movement of the tabletop and/or a direction of movement of the tabletop.

According to one embodiment, the reference arrangement comprises a first colored band with a first color code and a second colored band with a second color code, wherein the evaluation unit ascertains a rough position determination of the current position based on the first color code and specifies the rough position determination more precisely as a finer position determination of the current position based on the second color code.

A further aspect of one or more embodiments of the present invention is a reference arrangement with reference colors comprising a first colored band with a first color code, wherein the first color code has color-differentiated and non-repeating discrete color sections as reference colors along the path of movement, wherein the reference arrangement comprises a second colored band with a second color code, wherein the second color code has a plurality of periodically repeating sub-color codes along the path of movement, wherein each sub-color code has color-differentiated and non-repeating discrete color sections as further reference colors in the direction of the path of movement, wherein preferably the extension in the direction of the path of movement of each sub-color code is not less than the extension in the direction of the path of movement of a single one of the color sections of the first color code, wherein in particular the extension in the direction of the path of movement of each sub-color code at least substantially corresponds to the extension in the direction of the path of movement of a single one of the color sections of the first color code. All advantages and features of the position determination system, the medical imaging system and the method can be transferred analogously to the reference arrangement and vice versa.

All embodiments described herein can be combined with one another unless explicitly stated otherwise.

BRIEF DESCRIPTION OF THE DRAWINGS

The following describes embodiments with reference to the attached figures.

DETAILED DESCRIPTION

Figure 1:
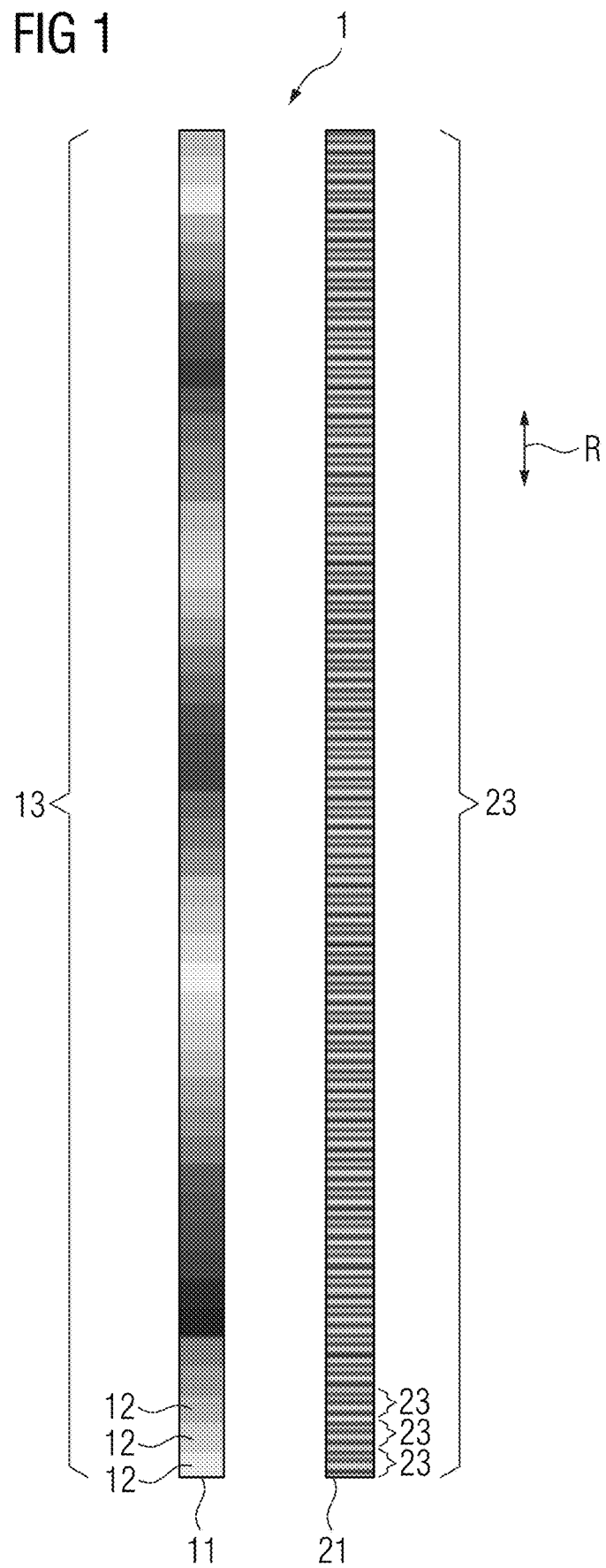
FIG. 1 shows a reference arrangement according to one embodiment of the present invention.

FIG. 1 shows a reference arrangement 1 according to one embodiment of the present invention. In this exemplary embodiment, the reference arrangement 1 comprises a first colored band 11 and a second colored band 21. The first colored band 11 has a first color code 13 with a plurality of color sections 12. Here, the color sections 12 of the first colored band 11 are depicted in in gray tones. However, preferably the color sections 12 are colored. Herein, each color section 12 has a discrete reference color. For example, it can be provided that first different gray tones (for example, from light to darker), then different red tones, different green tones, different blue tones and different violet tones are lined up in succession one after the other (in the direction R of the path of movement). Herein, preferably, particularly dark colors are not used since it has been found that light colors enable more reliable position determination in the context of embodiments of the present invention. The second colored band has a second color code 23, wherein the second color code in turn has a plurality of, in each case the same, sub-color codes 23. The sub-color codes 23 of the second colored band 21 in each case have the same reference colors in the same sequence as the first color code 13 of the first colored band 11. However, the color sections of the sub-color codes 23 are significantly narrower so that the width of each sub-color code 23 corresponds to the width of the color sections 12 of the first colored band 11.

Figure 2:
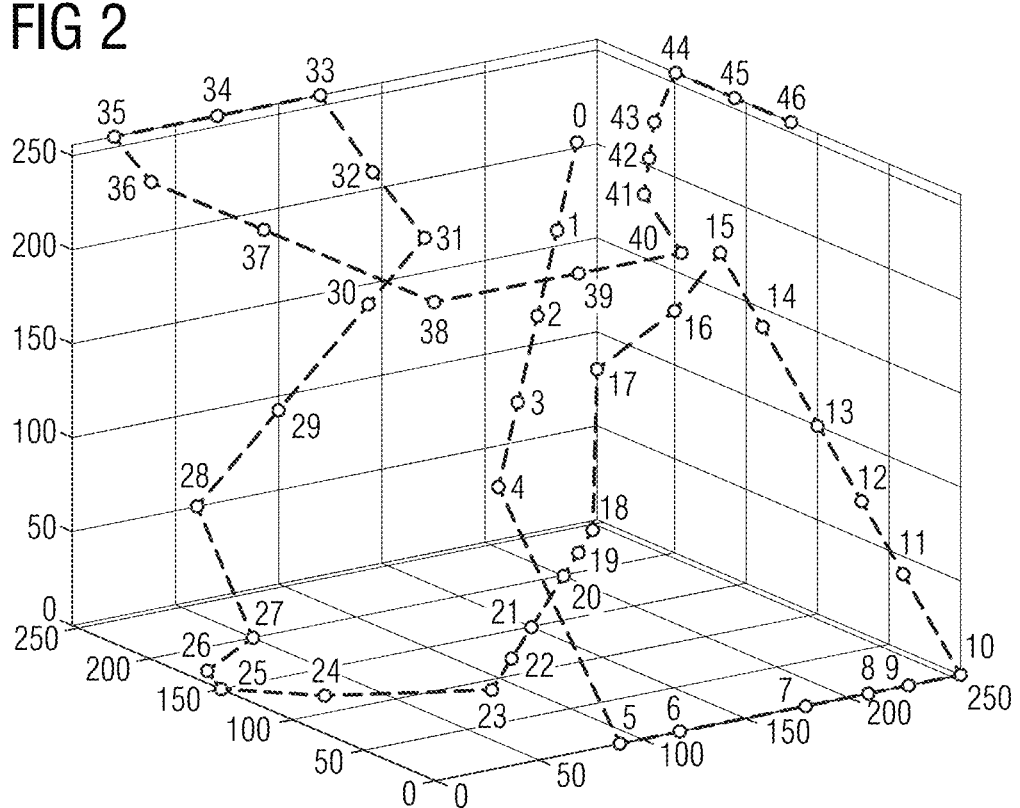
FIG. 2 shows a color space with a coherent trajectory of color values.

Preferably, the reference colors of the color codes 13, 23, are selected such and arranged one behind the other such that they lie in the color space on a non-self-intersecting coherent trajectory. This is shown in FIG. 2. Herein, FIG. 2 depicts a RGB color space, wherein the axes of the coordinate system correspond to the color channels blue, red and green. At transitions between the color sections 23, it can be the case that, at the boundary, the adjacent reference colors are mixed by the sensor head 41. Herein, mixed colors occur, which, corresponding to the overlap of the adjacent color sections 23, proportionally add the reference colors of the two color sections 23 to this mixed color. If this is not taken into account when selecting reference colors, ambiguities, and thus errors, can occur during position recognition. Lining up the reference colors according to a trajectory as shown in FIG. 2 can ensure that the mixed colors that occur between the adjacent reference colors on the respective colored band 11, 21 when the boundaries are scanned also lie on the trajectory connecting these two points and therefore there can be no collisions with other reference colors. Herein, in particular care was taken to ensure that the trajectory does not intersect with itself. In addition, the Euclidean distances in the color space between the successive reference colors are preferably selected to be substantially uniformly the same for all adjacent reference colors in order to enable particularly reliable recognition.

Figure 3:
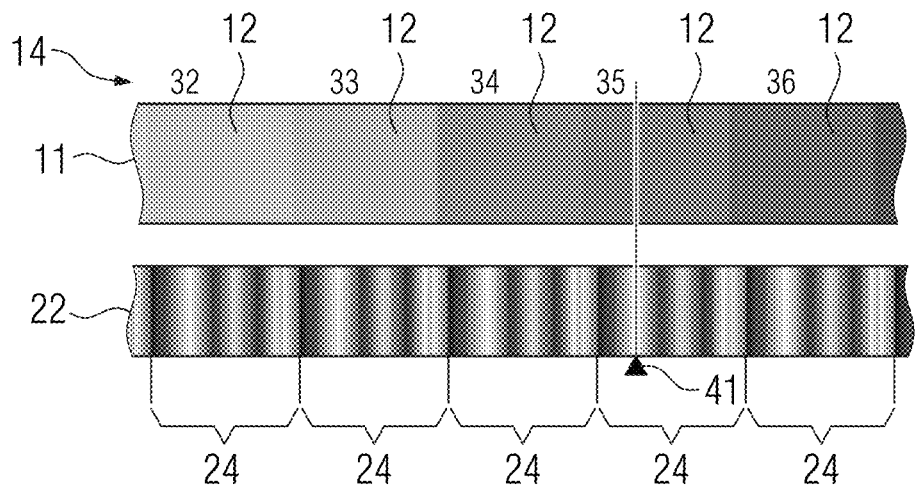
FIG. 3 shows a section of a reference arrangement according to an embodiment of the present invention.

FIG. 3 shows a section of a reference arrangement 1 according to an embodiment of the present invention. This can correspond to the reference arrangement 1 shown in FIG. 1. Herein, a color index 14 (in this section the numbers 32-36) designates the different reference colors of the first colored band 11 taken from the color space shown in FIG. 2. A sensor head 41 is shown schematically, which, at its current position, reads out the respective reference colors of the first colored band 11 and the second colored band 12. It can be provided that the following values are uniquely assigned to each color section in order to enable position determination:

Colorindex: the number of the color section on this colored band or this colored track, starting with 0, for example ColorWidth_mm: the width of the color section in mm Color: the nominal color values of the color section or the reference colors of the respective color section, in particular for the production of the colored band (for example in CMYK format)

Furthermore, in particular in the case of a plurality of colored bands, the following assignments can be provided: the number of colored bands or colored tracks (in particular 2 or 3) the number of colors per colored band or colored track (for example 47 for 2 tracks or 16 for 3 colored tracks).

The reference table (RT) can in particular consist of two or three tables (if two or three colored bands are used):

RT_1: <Colors_Track_1(i)>, <AbsPos(i)>
RT_2: <Colors_Track_2(j)>, <AbsPos(j)>
RT_3: <Colors_Track_3(k)>, <AbsPos(k)>

The placeholder AbsPos(i) stands for the absolute position with the index i. The placeholder <Colors_Track_1(i)> stands for measured intensities of the respective color channels at this position. Depending on which color channels are actually used, this dataset can, for example, consist of 5 color intensities <red(i), green(i), yellow(i), turquoise(i), blue(i)>. More generally, this can also be formulated as <Intensity_Color_Channel_1(i), Intensity_Color_Channel_2(i), . . . , Intensity_Color_Channel_n(i)>. For example, the position can be determined based on the scheme outlined below:

Colorindex_1=position of the minimum over all distances between RT_1(i) and measurement data Colorindex_2=position of the minimum over all distances between RT_2(j) and measurement data Colorindex_3=position of the minimum over all distances between RT_3(k) and measurement data The Euclidean color distances between RT_x(i) and measurement data can be calculated as follows (x stands for 1, 2 or 3 and i for i, j or k): DeltaVektor x(i)=RT)x(i)–measurement data.

Or more precisely, with the specification of the individual vector components (F1, F2 . . . ):

DeltaVektor_x(i)
.F1=RT_x.Intensity_Color_Channel_1(i)–Measurement_Data_Colored_Track_x.Intensity_Color_Channel_1

DeltaVektor_x(i)
.F2=RT_x.Intensity_Color_Channel_2(i)–Measurement_Data_Colored_Track_x.Intensity_Color_Channel_2

...

DeltaVektor_x(i)
.Fn=RT_x.Intensity_Color_Channel_n(i)−Measurement_Data_Colored_Track_x.Intensity_Color_Channel_n If, for example, 6 color channels are used, n=6.

Herein, the Euclidean distance is the length or norm of the vector DeltaVektor_x. This can be calculated as the root of the sum of the squares of its components.

If, for example, according to the scheme mentioned here, the two or three RT positions (in the case of 2 or 3 colored bands or colored tracks) are found in respective colored tracks, the absolute position of the sensor can, for example, be calculated as follows:

With two colored tracks:

AbsPos=ColorIndex_1*ColorWidth_mm_Track1+
ColorIndex_2*ColorWidth_mm_Track2

Or with three colored tracks:

AbsPos=ColorIndex_1*ColorWidth_mm_Track1+
ColorIndex_2*ColorWidth_mm_Track2+
ColorIndex_3*ColorWidth_mm_Track3

With a width of the color sections 12 of the first colored band of 47 mm and a width of the color sections of the second colored band 12 of 1 mm, the following is obtained for the current position (read-out point of the sensor head 41) in FIG. 2 with Position=35×47 mm+17×1 mm=1662 mmn a position of 1662 mm, wherein 35 is the color index 14 of the first colored band 11 and 17 the color index of the second colored band 21 (not mentioned in FIG. 2).

The speed of movement can be determined from two or more temporally successive positions if the time difference between the measurements is taken into account. The direction of movement can also be determined from a sequence of measurement data. Advantageously, this determination schema can be used not only to determine the absolute position of a linear movement (linear encoder), but also to determine the absolute angular position of a rotary movement.

Figure 4:
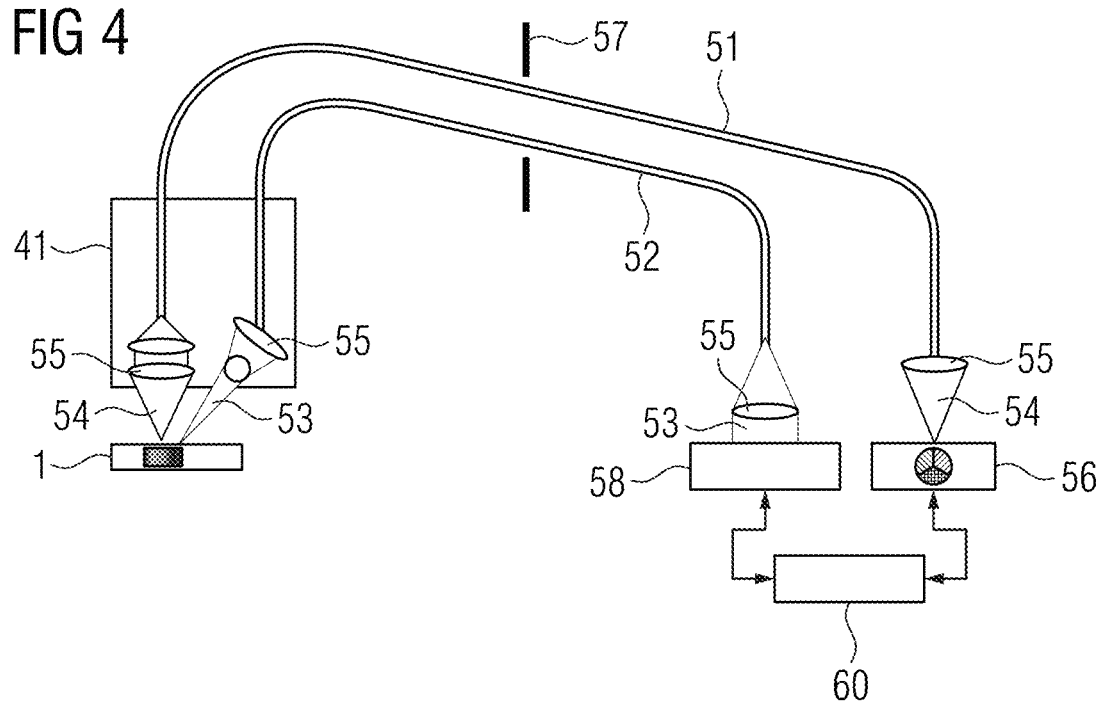
FIG. 4 shows a schematic structure of a position determination system according to an embodiment of the present invention.

FIG. 4 shows a schematic structure of the position determination system according to an embodiment of the present invention. Here, white light 53 is generated by an RGB LED 58, integrated into a light-source optical fiber 52 by collimation and focusing optics 55 and guided to the reference arrangement 1. There, the white light is directed or focused onto the colored bands of the reference arrangement 1 by further collimation and focusing optics 55. The colored light 54 reflected by the colored bands is integrated into an optical fiber 51 via further collimation and focusing optics 55. In this example, both the end of the light-source optical fiber 52 and the beginning of the optical fiber 51 are integrated into the sensor head 51. In addition, both optical fibers are routed through a filter plate 57, which can, for example, serve as a shield. Finally, the colored light 54 is guided from the optical fiber 51 to yet further collimation and focusing optics 55 by which it is focused onto one or more color sensors 56. The colors ascertained are then forwarded to a controller 60, which controls the position determination. The controller 60 can comprise an evaluation unit 70 that can determine a current position based on the reference colors ascertained.

Figure 5:
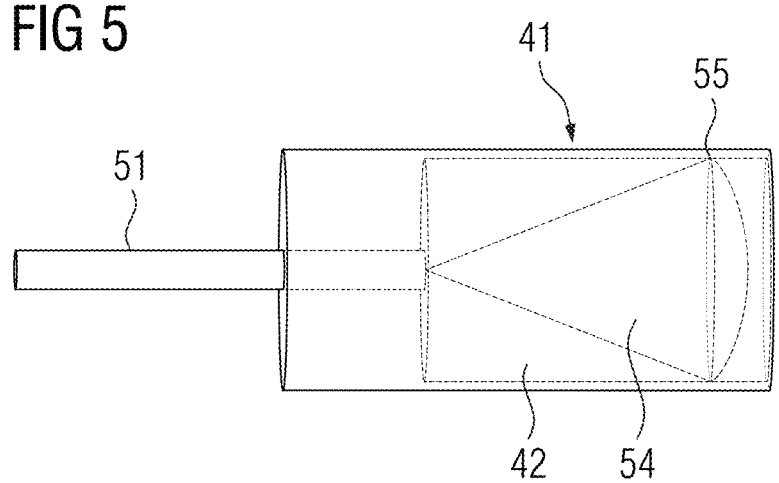
FIG. 5 shows a part of a sensor head according to one embodiment of the present invention.

FIG. 5 shows a part of a sensor head 41 according to one embodiment of the present invention. The sensor head 41 comprises a dust-tight area 42 that is sealed from the outside by a lens 55. As a result, it is advantageously ensured that the relatively small end faces of the optical fibers 51, 52 do not come into contact with dust. On the other hand, the significantly larger diameter of the lens 55 would overall require significantly more dust particles on the lens surface for the light transmission to significantly deteriorate to the same extent as would be the case with the optical fibers with this number of dust particles.

Figure 6:
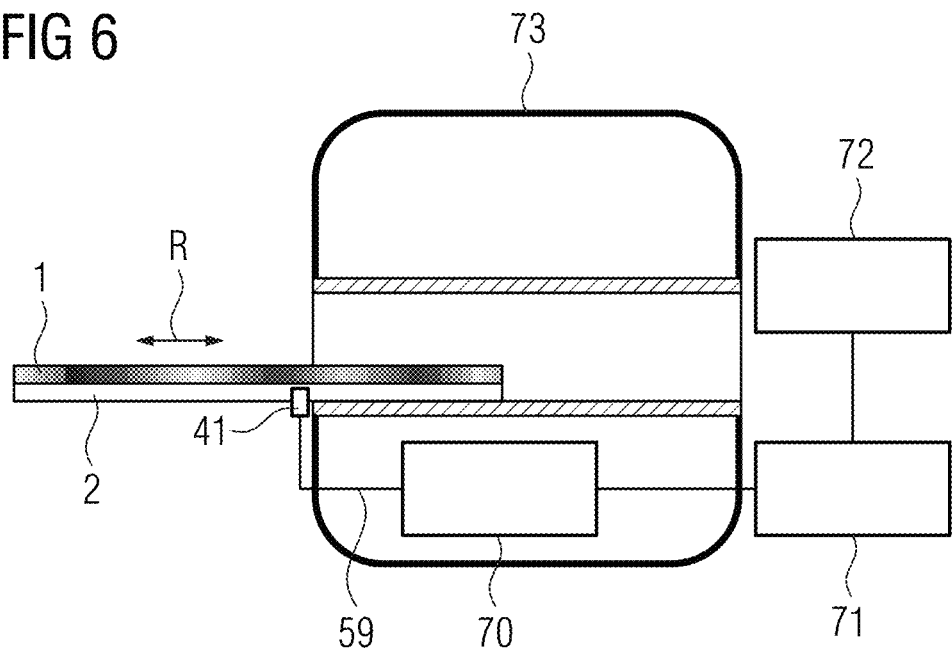
FIG. 6 shows a schematic representation of a medical imaging system according to one embodiment of the present invention.

FIG. 6 shows a schematic representation of a medical imaging system (a PET/MRI system) according to one embodiment of the present invention. The medical imaging system comprises a reference arrangement 1 according to an embodiment of the present invention, which is attached laterally to a tabletop 2 which can be moved in the direction of movement R shown into the examination area with an MRI magnet 73 of the medical imaging system. A sensor head 41 serves to read reference colors of the reference arrangement 1 at the current position in each case. The detected colors are forwarded to an evaluation unit 70 through an optical fiber bundle 59. The evaluation unit 70 is configured to determine the current position based on the detected reference colors. The evaluation unit 70 is in communication with a tabletop controller 71 via which the movement of the tabletop 2 is controlled. The tabletop controller 71 is in turn in communication with a scanner controller 72.

Figure 7:
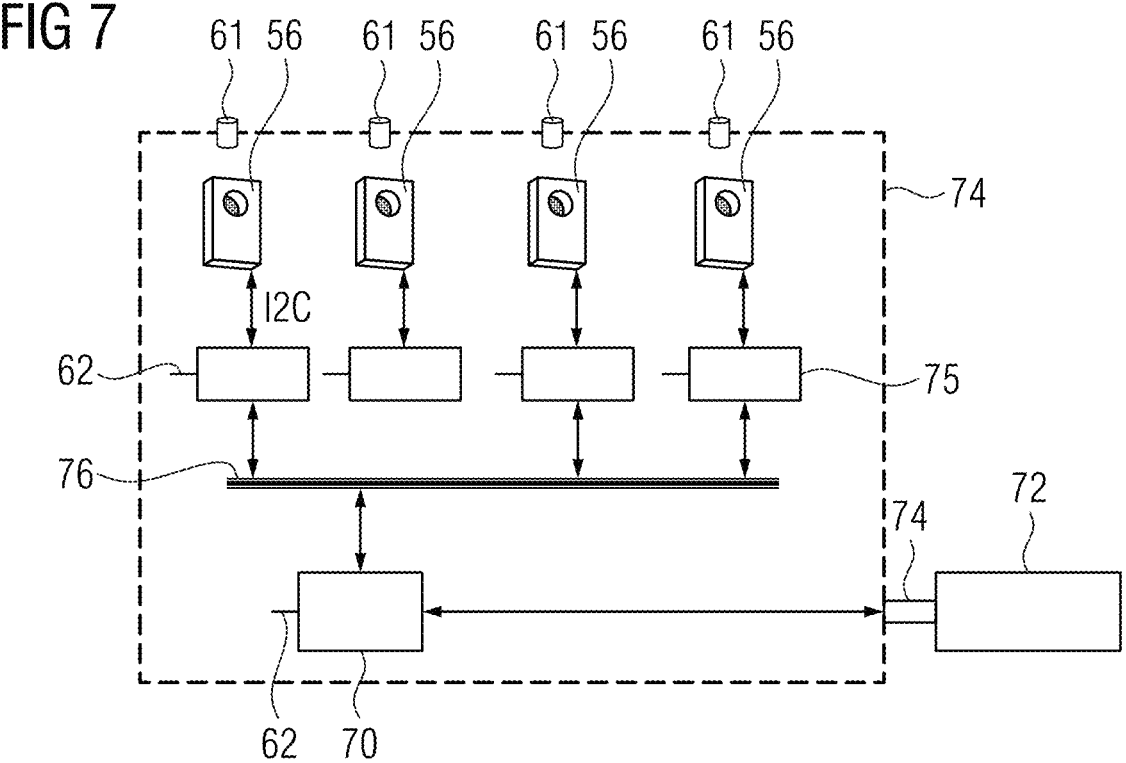
FIG. 7 shows a schematic structure of a position determination system according to a further embodiment of the present invention.

FIG. 7 shows a schematic structure of the position determination system according to a further embodiment of the present invention. Color sensors 56 detect the color information from a plurality of wavelengths and transmit it digitally via a data bus (here I2C) to a microcontroller 75 in each case for further evaluation. Herein, the colored light 54 is guided via optical fibers 51 into sensor openings of the color sensors 56. Parallel processing by a plurality of color sensors permits a high data rate with which the position can be detected at least 200 times a second in order to track a movement of the tabletop. One of the color sensors 56 serves to detect the intensity of the reference colors in the color spectrum of the light source simultaneously for measuring the colored bands. Depending upon the temperature of the LED, the temperature of its environment, the present current intensity of the LED driver (constant current sources can supply slightly fluctuating currents) and the service life that has already taken place, the light intensity can fluctuate. This is taken into account by the additional color sensor by standardizing to the measured intensities (white light standardization) so that these fluctuations can be taken into account. Here, each color sensor 57 has its own microcontroller (or I2C controller) 75 that collects the color data via an exclusive data bus (here I2C). This advantageously enables the color measurement to take place simultaneously with all color sensors 56, even if, as is usually the case in practice, the I2C address cannot be configured in commercially available color sensors 56, but is fixed by the manufacturer. When each microcontroller has detected the data of its assigned color sensor via I2C, the data can be transmitted serially via a faster bus (for example SPI 76) to a master microcontroller 70. The master microcontroller 70 coordinates or triggers the measurements via the respective microcontroller 75 in that they all "listen" to an IO pin 62 of the master microcontroller 70. As soon as the master microcontroller 70 sets this line to "start measurement", they all start taking the color measurements synchronously. As soon as the master microcontroller 70 has all the colors/measurement data, it standardizes all the color information to the white light of the last color sensor 56. The master microcontroller 70 can be or comprise the evaluation unit 70. Here, the electronics are shielded by an EMC shield 74 in order to avoid interference with a medical measurement (for example MRI measurements). The connection between the scanner controller 72 and master microcontroller 70 is also shielded by an EMC shield 74. A plurality of passages 61 are provided in the EMC shield 74 through which optical fibers 51 are routed.

Figure 8:
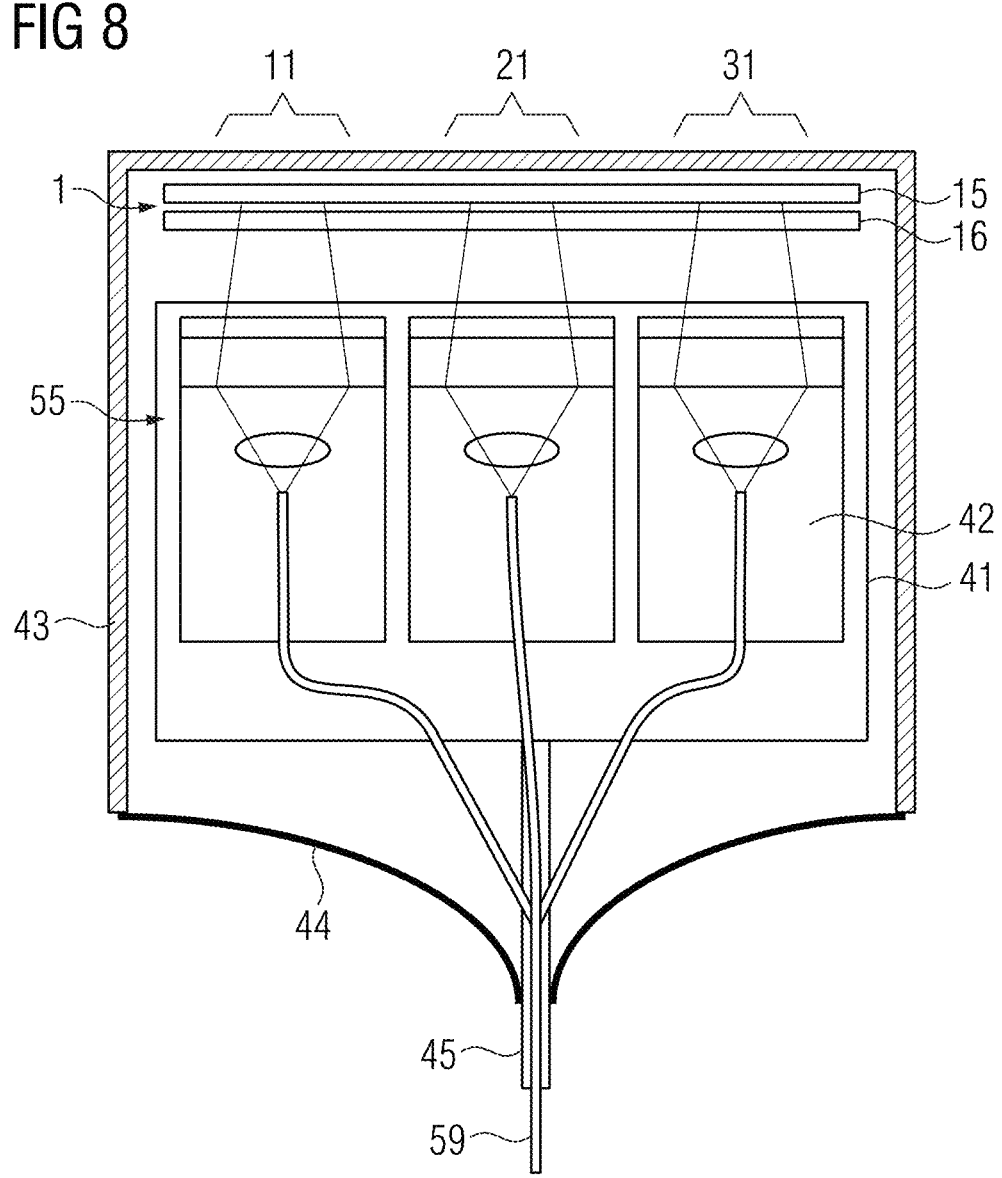
FIG. 8 shows a cross-sectional view of a sensor head according to one embodiment of the present invention.
Figure 9:
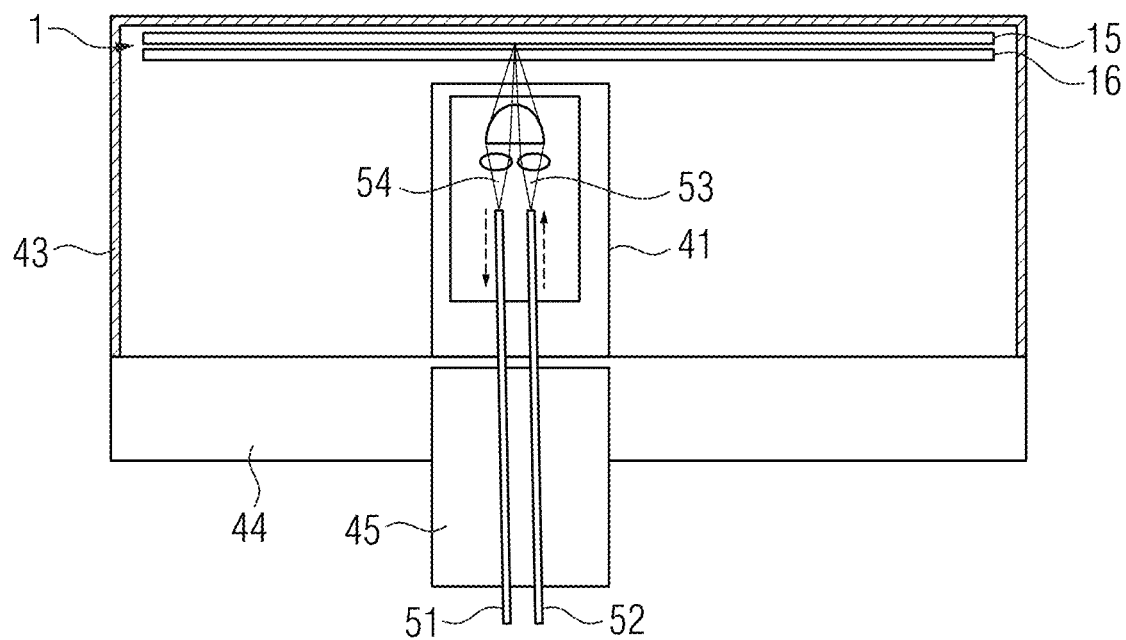
FIG. 9 shows a side view of a sensor head according to one embodiment of the present invention.

FIG. 8 and FIG. 9 show a cross-sectional view and a side view of a sensor head 41 according to one embodiment of the present invention. The sensor head 41 is surrounded by a U-shaped profile 43 with rubber lips 44 to protect it from dust and light. The rubber lips cover a head mount 45 which serves an output for an optical fiber bundle 59. In this embodiment, a reference arrangement 1 with three colored bands 11, 21, 31 is provided. Herein, light from the light-source optical fibers 52 is diverted to the colored bands 11, 21, 31 via collimation and focusing optics. The reference arrangement comprises a reflection layer 15 which is arranged behind a colored layer 16 comprising the colored bands 11, 12, 13. Herein, at each position of a colored band, the colored layer 16 is transparent to a reference color in each case so that white light 53 is converted by the colored layer 16 into colored light of the respective reference colors and returned to the optical fibers 51 by reflection at the reflection layer.

Figure 10:
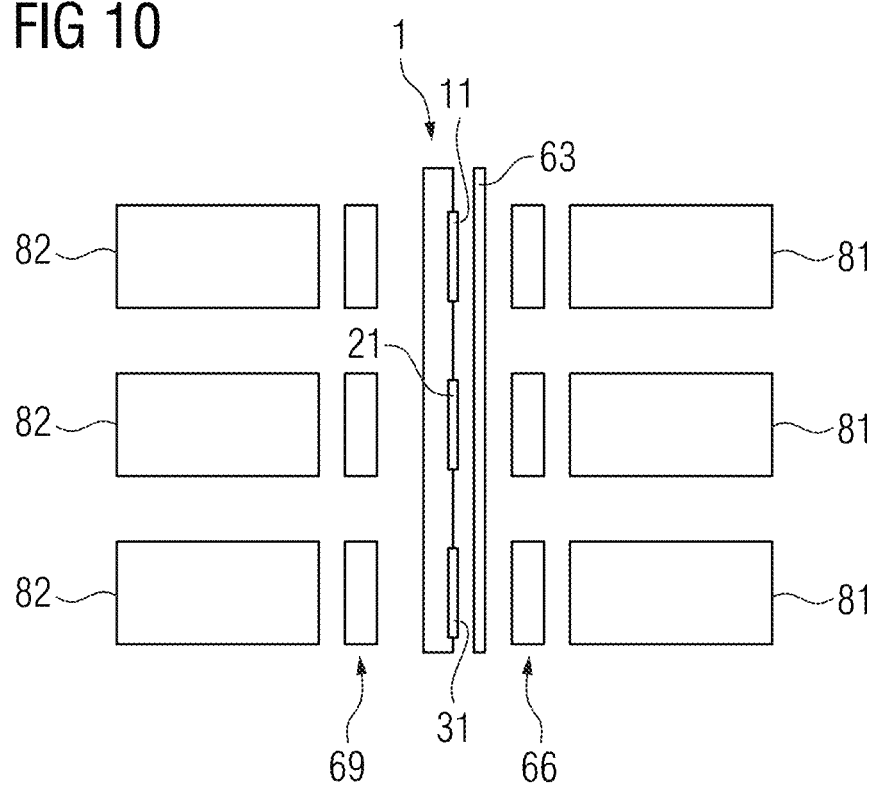
FIG. 10 shows a schematic view of a sensor head according to a further embodiment of the present invention.

FIG. 10 shows a schematic view of a sensor head 41 according to a further embodiment of the present invention. Here, the sensor head 41 comprises three light emitters 81 and three light receivers 82. This is an embodiment for three colored bands 11, 21, 31. However, this embodiment can also be applied analogously to a different number of colored bands. The light emitters 81 in each case generate, shape and project a light strip, in particular a generally diverging light strip, onto the colored bands assigned thereto in each case. Collimation optics 66, for example a cylindrical lens, form a collimated beam. An aperture 63 ensures that only a narrow strip of the collimated light passes through. Herein, a narrower light strip can enable finer resolution of the position determination. Here, the reference arrangement is embodied as a transparent carrier, for example made of plexiglass. Transparent colored tracks are applied to the carrier in accordance with the number of colored bands (here three), wherein a colored track in particular consists of a sequence of transparent colored strips, which only allow a specific color of light to pass through at the respective position. Herein, the color of the light can in particular mean a combination of wavelengths. Collecting optics 69 ("receiver") bundle the light to a point in the direction of light receivers 82. The light receivers 82 receive, shape and route the light in each case to one or more color sensors 56 integrated therein or connected thereto.

Figure 11:
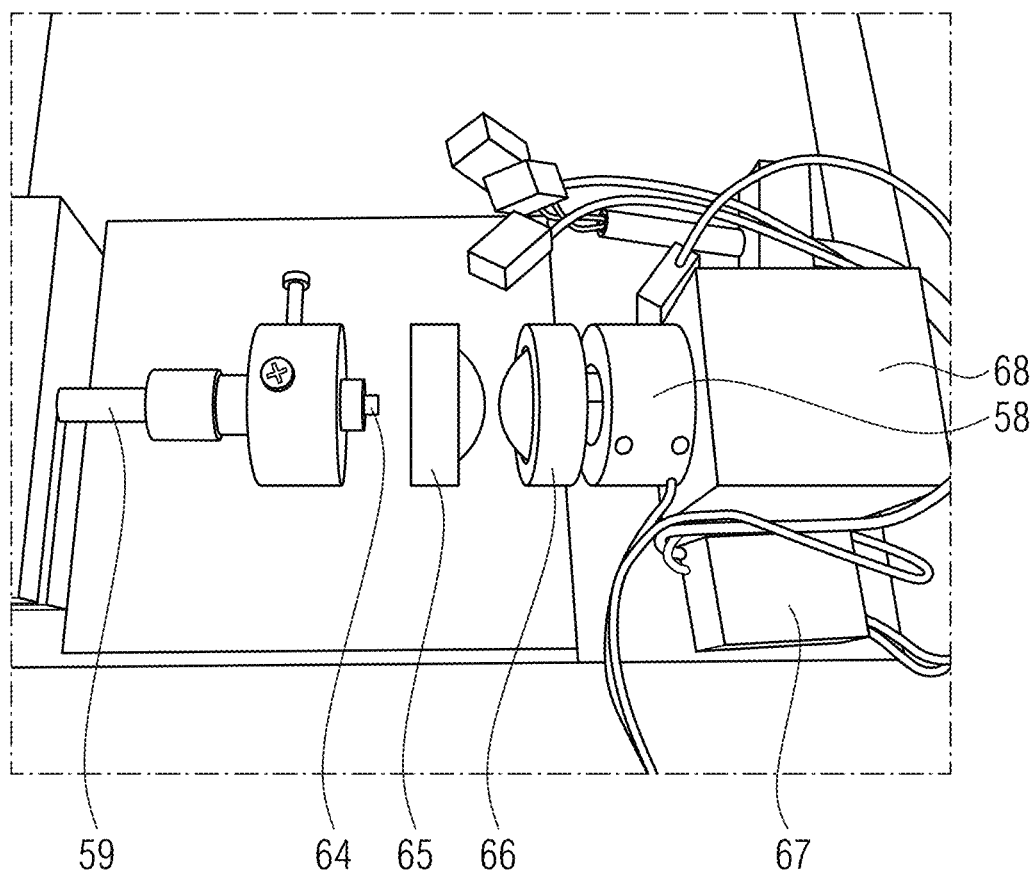
FIG. 11 shows a disassembled view of the coupling of white light from one or more LED(s) into an optical fiber bundle.

FIG. 11 shows a disassembled view of the coupling of white light 53 from one or more LED(s) 58 into the optical fiber bundle 59. A heat sink 68 prevents the LED(s) 58 from overheating. The light from the LED(s) 58 is efficiently coupled through two PCX lenses, namely a collimator lens 66 and a coupling lens 65 into the optical fiber bundle 59, which consists of a plurality of light-source optical fibers 52. A constant current source 67 supplies the LED(s) 58 with power.

Figure 12:
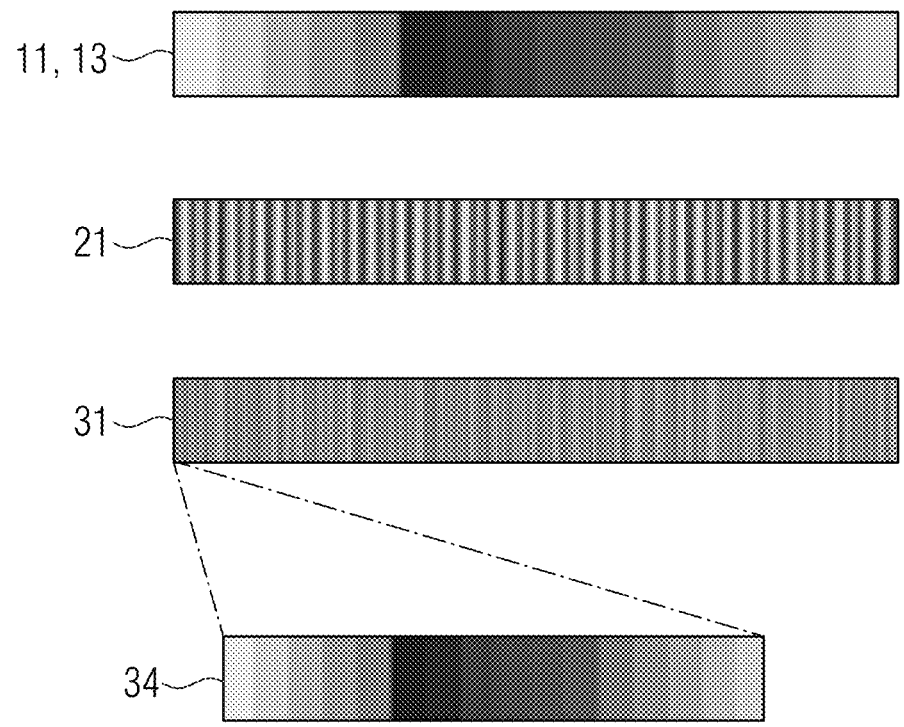
FIG. 12 shows a reference arrangement according to a further embodiment of the present invention.

FIG. 12 shows a reference arrangement 1 according to a further embodiment of the present invention. In this exemplary embodiment, the reference arrangement 1 comprises a first colored band 11, a second colored band 21 and a third colored band 31. In principle, the first colored band 11 and the second colored band 12 can be embodied according to the embodiment shown in FIG. 1. However, fewer different reference colors are provided for each colored band. Instead, here, better resolution is achieved by the third colored band 31. This in each case has further sub-color codes 34, which in each case correspond to the first color code 13 of the first colored band 11. The extension of the further sub-color codes 34 in the direction of the path of movement in each case corresponds to the extension of the color sections of the second colored band 21.

Figure 13:
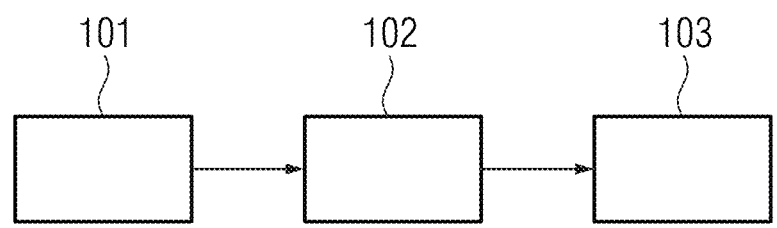
FIG. 13 shows a method for position determination of a tabletop according to one embodiment of the present invention.

FIG. 13 shows a method for position determination of a tabletop 2 according to one embodiment of the present invention. In a first step 101, a reference arrangement 1 with reference colors is illuminated with a light source. In a further step 102, the reference arrangement 1 is read out by a sensor unit by detecting the reference colors at the position of a sensor head 41 of the sensor unit and the detected reference colors are forwarded to an evaluation unit. In a next step 103, the current position of the tabletop is ascertained by an evaluation unit 70 based on the detected reference colors. Herein, the evaluation unit 70 can in particular ascertain a rough position determination of the current position based on a first color code 13 of a first colored band 11 of the reference arrangement 1 and specify the rough position determination more precisely as a finer position determination of the current position based on a second color code 23 of a second colored band 21 of the reference arrangement 1.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly"

on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A position determination system for detecting at least one of a position, a speed, or a direction of movement of an object configured to move along a path of movement, the position determination system comprising:
   a reference arrangement with reference colors including at least a first colored band with a first color code extending in a direction of the path of movement and a second colored band with a second color code, wherein along the path of movement, the first color code has first color-differentiated and non-repeating discrete color sections as first reference colors;
   a sensor unit with at least one sensor head, the sensor unit configured to read out the reference colors of the reference arrangement arranged at a position of the at least one sensor head to determine read out reference colors, and to forward the read out reference colors to an evaluation unit; and at least one light source configured to illuminate the reference colors of the reference arrangement arranged at the position of the at least one sensor head, wherein either the at least one sensor head or the reference arrangement is configured to be fastened to the object, the second color code has a plurality of sub-color codes that are periodically repeated along the path of movement, each sub-color code has, as further reference colors, second color-differentiated and non-repeating discrete color sections in the direction of the path of movement, and an extension in the direction of the path of movement of each sub-color code is not less than an extension in the direction of the path of movement of a single one of the first color-differentiated and non-repeating discrete color sections of the first color code.

2. The position determination system as claimed in claim 1, wherein at least one of the first color-differentiated and non-repeating discrete color sections of the first colored band or color sections of at least one further colored band are transparent to light of a color of a respective color section and opaque to light of colors of color sections different from the respective color section, wherein the at least one light source and the at least one sensor head are arranged on opposite sides of the reference arrangement, and wherein the sensor unit is configured to detect light from the at least one light source transmitted through the first color-differentiated and non-repeating discrete color sections of the first colored band or the color sections of the at least one further colored band, or the at least one light source and the at least one sensor head are arranged on a same side of the reference arrangement opposite at least the first colored band, wherein from a viewpoint of the at least one light source, a reflector is arranged behind the first color-differentiated and non-repeating discrete color sections of the first colored band or the color sections of the at least one further colored band so that light emanating from the at least one light source passes from the reflector to the at least one sensor head after being transmitted twice through the respective color section and being reflected in-between.

3. The position determination system as claimed in claim 1, wherein, when viewed in the direction of the path of movement, the reference colors of at least one color code are selected and arranged one behind another such that the reference colors of the at least one color code lie in a color space on a non-self-intersecting coherent trajectory, wherein Euclidean distances of adjacent colors in the color space are in each case at least substantially a same size and maximized with respect to a total available color space, and wherein the at least one color code includes at least one of the first color code or further color codes.

4. The position determination system as claimed in claim 1, wherein the object is a tabletop of a medical imaging system.

5. The position determination system as claimed in claim 1, wherein at least one of the first color-differentiated and non-repeating discrete color sections of the first colored band or color sections of at least one further colored band are opaque to colors of the first colored band or the at least one further colored band, and wherein the sensor unit is configured to read out the first color-differentiated and non-repeating discrete color sections of the first colored band or the color sections of the at least one further colored band by detecting light emanating from the at least one light source and reflected by the first color-differentiated and non-repeating discrete color sections of the first colored band or the color sections of the at least one further colored band.

6. The position determination system as claimed in claim 5, wherein the color sections of all colored bands are opaque to colors of the colored bands.

7. The position determination system as claimed in claim 1, wherein the position determination system includes at least one optical fiber connected to the at least one sensor head, the at least one optical fiber configured to guide light from the at least one sensor head to a central unit of the sensor unit, and wherein the central unit is configured to determine a wavelength of detected light.

8. The position determination system as claimed in claim 7, wherein the at least one sensor head has a dust-tight area in an area of the at least one optical fiber, such that dust deposition on an end face of the at least one optical fiber is reduced, and wherein an outer wall of the dust-tight area has at least one lens between the at least one optical fiber and the reference arrangement.

9. The position determination system as claimed in claim 8, wherein the at least one lens includes at least one converging lens.

10. The position determination system as claimed in claim 1, wherein the position determination system includes the evaluation unit, and wherein the evaluation unit is configured to receive the read out reference colors and to ascertain a current position of the object based on the reference colors.

11. The position determination system as claimed in claim 10, wherein the evaluation unit includes a database in which determined reference colors are assigned to positions, and wherein the evaluation unit is configured to detect a determined reference color with a shortest distance to the reference color detected in each case in a color space, and to assign a position within a third color code to determine the reference color based on the database.

12. The position determination system as claimed in claim 11, wherein the evaluation unit is configured to determine a rough position based on a detected reference color of the first colored band and to specify the rough position more precisely as a finer position determination based on a detected reference color of a further colored band.

13. A medical imaging system comprising:
the position determination system as claimed in claim 1; and
a patient table tabletop, wherein
the reference arrangement is at least one of fastened to or arranged on the patient table tabletop.

14. The medical imaging system of claim 13, wherein the medical imaging system is a PET/MRI imaging system.

15. A method for position determination of a tabletop of a medical imaging system using the position determination system as claimed in claim 1, the method comprising:
- illuminating the reference arrangement with the at least one light source at the position of a sensor head of the sensor unit, the reference arrangement including the reference colors;
- reading out the reference arrangement by detecting, at the sensor unit, the reference colors at the position of the sensor head to determine detected reference colors, and forwarding the detected reference colors to the evaluation unit; and
- ascertaining, by the evaluation unit, a current position of the tabletop based on the detected reference colors.

16. The method as claimed in claim 15,
wherein the reference arrangement includes the first colored band with the first color code and the second colored band with the second color code, and
the method includes
- determining, by the evaluation unit, a rough position of the current position based on the first color code, and
- specifying the rough position more precisely as a finer position determination of the current position based on the second color code.

17. A reference arrangement comprising:
reference colors including a first colored band with a first color code and a second colored band with a second color code,
wherein, along a path of movement, the first color code has first color differentiated and non-repeating discrete color sections as first reference colors,
wherein the second color code has a plurality of periodically repeating sub-color codes along the path of movement,
wherein each sub-color code has, as second reference colors, second color-differentiated and non-repeating discrete color sections in a direction of the path of movement, and
wherein an extension in the direction of the path of movement of each sub-color code is not less than an extension in the direction of the path of movement of a single one of the first color differentiated and non-repeating discrete color sections of the first color code.

* * * * *